United States Patent
Kim et al.

(10) Patent No.: US 10,487,174 B2
(45) Date of Patent: Nov. 26, 2019

(54) METHOD FOR PREPARING POLYACTIC ACID

(71) Applicant: LOTTE CHEMICAL CORPORATION, Seoul (KR)

(72) Inventors: Hyun A Kim, Daejeon (KR); Myung Joo Ko, Seoul (KR); Jong Won Kang, Daejeon (KR)

(73) Assignee: LOTTE CHEMICAL CORPORATION, Seoul (KR)

( * ) Notice: Subject to any disclaimer, the term of this patent is extended or adjusted under 35 U.S.C. 154(b) by 6 days.

(21) Appl. No.: 15/750,862

(22) PCT Filed: Aug. 10, 2016

(86) PCT No.: PCT/KR2016/008802
§ 371 (c)(1),
(2) Date: Feb. 7, 2018

(87) PCT Pub. No.: WO2017/026799
PCT Pub. Date: Feb. 16, 2017

(65) Prior Publication Data
US 2018/0230266 A1    Aug. 16, 2018

(30) Foreign Application Priority Data

Aug. 11, 2015 (KR) ........................ 10-2015-0113236

(51) Int. Cl.
*C08G 63/78* (2006.01)
*C08G 63/08* (2006.01)
*C08G 63/90* (2006.01)

(52) U.S. Cl.
CPC ............. *C08G 63/08* (2013.01); *C08G 63/90* (2013.01)

(58) Field of Classification Search
USPC ................................. 528/271, 272, 273, 274
See application file for complete search history.

(56) References Cited

U.S. PATENT DOCUMENTS

| | | | |
|---|---|---|---|
| 5,880,254 A | 3/1999 | Ohara et al. | |
| 2002/0123605 A1 | 9/2002 | Kennedy et al. | |
| 2011/0263799 A1 | 10/2011 | Haan et al. | |
| 2012/0095169 A1* | 4/2012 | Ogawa | C08L 67/04 525/450 |
| 2013/0012631 A1* | 1/2013 | Serizawa | C08K 5/0066 524/135 |
| 2013/0158209 A1* | 6/2013 | Takahashi | C08G 63/08 525/450 |
| 2013/0197186 A1 | 8/2013 | Nagano et al. | |
| 2014/0142276 A1* | 5/2014 | Tanaka | C08G 63/06 528/361 |

FOREIGN PATENT DOCUMENTS

| | | |
|---|---|---|
| CN | 102112521 | 6/2011 |
| CN | 103124760 | 5/2013 |
| CN | 103819658 | 5/2014 |
| JP | 07-228674 | 8/1995 |
| JP | 08-193124 | 7/1996 |
| JP | 08-231688 | 9/1996 |
| JP | 09-095531 | 4/1997 |
| JP | 09-124778 | 5/1997 |
| JP | 3352890 | 5/1998 |
| JP | 2005-248117 | 9/2005 |
| JP | 4947956 | 5/2007 |
| JP | 2010-077350 | 4/2010 |
| KR | 10-0324986 | 7/2002 |
| KR | 10-2007-0067617 | 6/2007 |
| KR | 10-2011-0058782 | 6/2011 |
| WO | 1994-07941 | 4/1994 |
| WO | 2002-014402 | 2/2002 |
| WO | 2012-042993 | 4/2012 |

OTHER PUBLICATIONS

PCT Search Report & Written Opinion of PCT/KR2016/008802 dated Oct. 28, 2016.
Extended European Search Report of the corresponding European Patent Application No. 16835439.7., dated Mar. 11, 2019.

* cited by examiner

*Primary Examiner* — Terressa Boykin

(74) *Attorney, Agent, or Firm* — Lex IP Meister, PLLC

(57) ABSTRACT

The present invention relates to a method for preparing polylactic acid. According to the method for preparing polylactic acid, high quality polylactic acid can be provided by effectively removing residual monomers while minimizing property changes of the polylactic acid.

8 Claims, No Drawings

METHOD FOR PREPARING POLYACTIC ACID

TECHNICAL FIELD

The present invention relates to a method for preparing polylactic acid.

BACKGROUND ART

Although polylactic acid has been used mainly in the medical fields because it is decomposed in living bodies and has excellent mechanical properties, development to various industrial uses or general uses are expected in terms of environmental protection because it can be also decomposed in the natural environment by microorganisms, etc.

As a method for preparing polylactic acid, a method for preparing polylactic acid by heating lactides, a cyclic ester compound, in the presence of a catalyst to conduct ring-opening polymerization of lactides, is known.

In the polylactic acid obtained through the ring-opening polymerization, unreacted monomers remain. However, since the unreacted monomers cause problems of property deterioration by hydrolysis, etc., it is required to decrease the content of residual monomers in polylactic acid.

For this, in Patent Document 1, a method of removing residual monomers in polylactic acid by transferring liquid polylactic acid after polymerization is finished to a biaxial kneader and reducing the pressure is suggested, and in Patent Document 2, a method of removing residual monomers in pellet-shaped polylactic acid using high temperature nitrogen is suggested.

However, the methods suggested in Patent Documents 1 and 2 required a long process time, and caused a problem in that polylactic acid was decomposed, thus significantly decreasing molecular weight in the process of removing residual monomers. Therefore, there is urgent demand for studies on a method capable of removing unreacted monomers without adversely influencing polylactic acid.

PRIOR ART DOCUMENT

Patent Document

Japanese Registered Patent Publication No. 3352890 (Publication Date: 2002 Dec. 3)
Japanese Registered Patent Publication No 3589333 (Publication Date: 2004 Nov. 17)

DETAILED DESCRIPTION OF THE INVENTION

Technical Problem

It is an object of the present invention to provide a method for preparing polylactic acid.

Technical Solution

According to one embodiment of the present invention, a method for preparing polylactic acid including: a polymerization step wherein lactides or lactic acids are polymerized, and sterically hindered phenol is added when residual monomers are 1 to 8 mol % of the total monomers introduced, and additionally reacted to obtain a polymer; a cooling step wherein pellets are obtained from the polymer; and a step of removing residual monomers wherein an inert gas is introduced into a reactor containing the pellets at a velocity of 0.001 to 0.5 L/min while being heated, is provided.

According to the preparation method of the above embodiment, polylactic acid in which residual monomers are effectively removed can be provided while minimizing a molecular weight decrease rate in the process of removing residual monomers in polylactic acid.

Hereinafter, a method for preparing polylactic acid according to a specific embodiment of the invention will be explained.

In the polymerization step, precursors of polylactic acid are polymerized to provide a polymer. The polymerization step may be conducted by methods known in the technical field to which the present invention pertains, except that sterically hindered phenol is added at the end of the polymerization reaction to conduct additional polymerization reaction.

For example, in the polymerization step, first, precursors of polylactic acid may be polymerized. As the precursor of polylactic acid, lactide or lactic acid may be used, and a mixture of lactide and lactic acid may be used. More specifically, in the polymerization step, L-lactide, D-lactide, DL-lactide, meso-lactide, L-lactic acid, D-lactic acid, DL-lactic acid, or mixtures thereof may be polymerized.

The precursor of polylactic acid may be polymerized in the presence of a catalyst. Examples of the catalyst that can be used in the polymerization step may include lead oxide, calcium oxide, aluminum oxide, iron oxide, calcium chloride, zinc acetate, paratoluene sulfonic acid, stannous chloride, stannous sulfate, stannous oxide, stannic oxide, stannous octylate, tetraphenyltin, tin powder, titanium tetrachloride, etc. The catalyst may be used in an appropriate amount according to the content of the precursor of polylactic acid or polymerization conditions, etc., and for example, it may be used in an amount of about 0.0005 to 5 parts by weight, or about 0.003 parts by weight to 1 part by weight, based on 100 parts by weight of the precursor of polylactic acid.

In the polymerization step, an initiator may be additionally used. Examples of the initiator that can be used in the polymerization step may include alcohols, etc. The initiator may be used in an appropriate amount according to the content of the precursor of polylactic acid or polymerization conditions, etc., and for example, it may be used in an amount of about 0.00005 to 0.01 moles, based on 1 mole of the precursor of polylactic acid.

In the polymerization step, the precursor of polylactic acid may be polymerized using an appropriate reactor. The reactor that can be used in the polymerization step is not specifically limited, and as non-limiting examples, reactors equipped with various shapes of impellers, etc. may be used.

In the polymerization step, the polymerization temperature may be controlled to about 170 to 210° C. or about 180 to 200° C. so as to smoothly progress the polymerization reaction.

According to the preparation method of the above embodiment, sterically hindered phenol is added at the end of the polymerization reaction and additional reaction is conducted.

Since the sterically hindered phenol inactivates a catalyst, it is added at the end of the polymerization reaction, and more appropriately, it is added when residual monomers are 1 to 8 mol % or 3 to 8 mol % of the total monomers introduced. The content of residual monomers may be related to the conversion rate of polylactic acid, and if the polylactic acid conversion rate is about 95%, residual monomers may be about 5 mol %.

Further, the additional reaction that is conducted after adding the sterically hindered phenol may be conducted by maintaining the polymerization reaction conditions before adding the sterically hindered phenol. That is, after adding the sterically hindered phenol, the polymerization reaction is not finished, but the polymerization reaction conditions are maintained for a period of time so that the sterically hindered phenol may sufficiently inactivate a catalyst, and may be uniformly distributed in polylactic acid. Particularly, since the polymerization reaction is conducted at a sufficiently high temperature, the sterically hindered phenol may be added to the liquid polylactic acid and uniformly distributed throughout the polylactic acid.

The additional reaction time after adding the sterically hindered phenol may be controlled to about 80 minutes to 180 minutes or 80 minutes to 120 minutes so as to efficiently inactivate a catalyst and uniformly distribute the sterically hindered phenol. However, the conditions of the additional reaction are not necessarily the same as the polymerization reaction conditions before adding the sterically hindered phenol, and may be appropriately controlled differently according to the kind of sterically hindered phenol used.

Since the sterically hindered phenol inactivates a catalyst and has an excellent antioxidation effect, it may effectively inhibit side reactions in the process of removing residual monomers that is subsequently progressed. As the sterically hindered phenol, for example, 2',3-bis-[3-(3,5-di-tert-butyl-4-hydroxyphenyl)propionyl]propionohydrazide, pentaerythritol tetrakis(3-(3,5-di-tert-butyl-4-hydroxyphenyl)propionate), octadecyl-3-(3,5-di-tert-butyl-4-hydroxyphenyl) propionate, or a mixture thereof may be used.

The content of the sterically hindered phenol may be appropriately controlled according to the content of the precursor of polylactic acid, the kind and content of a catalyst used, the conditions of the polymerization reaction, etc., and for example, it may be used in an amount of about 0.01 to 5 parts by weight or 0.1 to 1 part by weight, based on 100 parts by weight of the precursor of polylactic acid.

The polymer obtained through the polymerization step may have a weight average molecular weight of about 50,000 to 500,000 g/mol or about 100,000 to 250,000 g/mol. In the polymer obtained through the polymerization step, monomers of an amount corresponding to about 0.5 to 15 wt % or about 1 to 10 wt % of the total weight of polylactic acid may remain.

In the polymerization step, polylactic acid is polymerized at a high temperature to obtain a liquid polymer. Thus, the polymer obtained in the polymerization step may be pelletized through a cooling step. The cooling step may be conducted by various methods known in the technical field to which the present invention pertains so as to solidify the liquid polymer. For example, in the cooling step, the polymer may be solidified through various condensers to provide pellets, or the polymer may be discharged, extruded, injection molded, or spun to provide pellets.

The size of the pellet obtained through the cooling step is not specifically limited, but it may be controlled to about 1 to 10 mm so as to effectively remove residual monomers in the subsequent process.

The pellets obtained through the cooling step may be introduced in the step of removing residual monomers to provide polylactic acid with excellent quality.

In the step of removing residual monomers, they may be removed by contacting the pellets with a heated inert gas in an appropriate reactor. Here, the sequence of adding the pellets and inert gas may be appropriately controlled. For example, polylactic acid may be added while introducing the inert gas of room temperature into a reactor, thereby substituting the air inside of the reactor with the inert gas to inhibit side reactions and minimize property changes of the polylactic acid.

In the step of removing residual monomers, the inert gas may be introduced into a reactor containing the pellets while being heated. The heating of the inert gas may be progressed at a temperature above the glass transition temperature and below the melting temperature of polylactic acid so as to prevent a color change or molecular weight decrease of the pellets, i.e., the polylactic acid. Specifically, the inert gas may be heated to a temperature of about 100° C. to 170° C. or about 120° C. to 160° C. and introduced into the reactor containing the pellets. Particularly, in the preparation method of the above embodiment, since sterically hindered phenol is added in the polymerization step, even if the process temperature of the step of removing residual monomers is high, the color, molecular weight, etc. of the polylactic acid may be excellently maintained.

The inert gas may be introduced into the reactor containing the pellets while being heated at a certain velocity. The heating velocity of the inert gas may be controlled to about 1 to 20° C./min or about 1 to 10° C./min.

Meanwhile, the inert gas may be introduced into the reactor containing the pellets while being heated at certain velocities set up according to temperature sections for two or more temperature sections. Specifically, the inert gas may be intruded into the reactor containing the pellets while being heated from room temperature to a temperature of 100 to 130° C. at the first velocity of 1 to 10° C./min (a first temperature section), and heated from a temperature of 100 to 130° C. to a temperature of 130 to 170° C. at the second velocity of 1 to 20° C./min (a second temperature section). Here, the first and second velocities are different from each other, and the first velocity is controlled to be slower than the second velocity, thus minimizing property changes of the polylactic acid. More specifically, the inert gas may be introduced while being heated from room temperature to a temperature of 110 to 130° C. or a temperature of 120° C. (a first temperature section) at the velocity of 1 to 5° C./min or 2° C./min, and heated from a temperature of 110 to 130° C. or a temperature of 120° C. to a temperature of 130 to 160° C. or a temperature of 160° C. (a second temperature section) at the second velocity of 1 to 10° C./min or 4° C./min. As such, by introducing the inert gas while heating in multiple stages, residual monomers may be effectively removed while minimizing property changes of the polylactic acid.

Particularly, the inert gas may be introduced at the velocity of 0.001 to 0.5 L/min·g, thus minimizing a molecular weight decrease of the polylactic acid. More specifically, if the inert gas is controlled as explained in the above embodiment of the present invention, even if the step of removing residual monomers is passed, a molecular weight decrease rate of about 5% or less, compared to the polymer obtained before the step of removing residual monomers, may be exhibited. The molecular weight decrease rate described herein may be calculated through the following Formula 1.

$$\text{Molecular weight decrease rate (\%)} = [(M_0 - M_1)/M_0] \times 100 \qquad \text{[Formula 1]}$$

In Formula 1, $M_0$ is the weight average molecular weight of the polymer (polylactic acid) obtained in the polymerization step before the step of removing residual monomers, and $M_1$ is the weight average molecular weight of the polylactic acid passing through the step of removing residual monomers.

Further, L/min·g means the volume of gas at room temperature and atmospheric pressure introduced for 1 minute for 1 g of pellets.

The inert gas that can be used in the step of removing residual monomers includes all gases that do not react with polylactic acid, and for example, nitrogen, argon, anhydrous air, etc. may be used.

The step of removing residual monomers may be conducted under reduced pressure, as necessary. The pressure of the step of removing residual monomers may be appropriately controlled according to the process conditions such as process temperature, etc., and for example, if the step of removing residual monomers is conducted under reduced pressure, the pressure may be controlled to about 0.01 kPa to 13.3 kPa.

According to the preparation method of the above embodiment, by adding sterically hindered phenol in the polymerization step, the temperature of the step of removing residual monomers may be increased, and thus, in the step of removing residual monomers, a time for which inert gas is introduced may be controlled to about 1 to 30 hours or 10 to 18 hours. Thus, the time of the process of removing residual monomers previously being about 40 hours may be largely decreased, thus reducing production cost and increasing production amount. Further, according to the preparation method of the above embodiment, since polylactic acid contacts the heated inert gas, moisture remaining in the polylactic acid may be removed and a drying process may be omitted when processing the polylactic acid, and thus, it is expected that various products can be more effectively produced from the polylactic acid.

Advantageous Effects

According to the preparation method of polylactic acid of one embodiment of the present invention, residual monomers may be effectively removed while minimizing property changes of polylactic acid, thus providing high quality polylactic acid.

DETAILED DESCRIPTION OF THE EMBODIMENTS

Hereinafter, the actions and effects of the present invention will be explained in more detail through specific examples. However, these examples are presented only as illustrations of the invention, and the scope of the present invention is not limited thereby.

Example

A Method for Preparing Polylactic Acid

Into a reactor, 3 kg of L-lactides vacuum dried for more than 12 hours were introduced, and the air inside of the reactor was substituted with nitrogen by nitrogen purging for 30 minutes. The temperature of the reactor was then raised to 185° C. At this time, 150 ppm of tin octylate as a catalyst and 0.3 g of alcohol as a reaction initiator were introduced to the reactor to conduct a polymerization reaction.

When the polylactic acid conversion rate reached about 93% through the polymerization reaction, Irganox MD 1024 (Manufacturing Company: Ciba Corporation) was added in an amount of 0.5 wt % based on the total amount of L-lactides introduced first, and additional polymerization reaction was conducted for 90 minutes.

After the polymerization reaction was finished, the obtained polymer (polylactic acid) was discharged and pelletized. The weight average molecular weight of the obtained pellets was 172,099 g/mol, and in the pellets, monomers of an amount corresponding to about 7.2 wt % of the total weight of polylactic acid remained.

Thereafter, the pellets were introduced into a cylindrical reactor. nitrogen was introduced into the lower part of the reactor at a velocity of 0.01 L/min·g for about 14 hours, wherein nitrogen was introduced while being heated from room temperature to 120° C. at a velocity of about 2° C./min, and being heated from 120° C. to 160° C. at a velocity of about 4° C./min.

The weight average molecular weight of the final polylactic acid in which residual monomers were removed through the above process was 171,782 g/mol, and in the final polylactic acid, monomers of an amount corresponding to about 0.1 wt % of the total weight of polylactic acid remained.

Thus, it is confirmed that according to the preparation method of one embodiment of the present invention, polylactic acid with a molecular weight decrease rate of about 0.2% but a very small content (0.1 wt %) of residual monomers can be obtained.

Comparative Example 1

A method for Preparing Polylactic Acid

Into a reactor, 3 kg of L-lactides vacuum dried for more than 12 hours were introduced, and the air inside of the reactor was substituted with nitrogen by nitrogen purging for 30 minutes. The temperature of the reactor was then raised to 185° C. At this time, 300 ppm of tin octylate as a catalyst and 4.3 g of alcohol as a reaction initiator were introduced into the reactor to conduct a polymerization reaction.

When the polylactic acid conversion rate reached about 95%, the polymerization reaction was finished, and the polymer (polylactic acid) was discharged and pelletized. The weight average molecular weight of the obtained pellets was 194,462 g/mol, and monomers corresponding to about 5.4 wt % of the total weight of polylactic acid remained in the pellets.

Thereafter, the pellets were introduced into a cylindrical reactor. Further, nitrogen was introduced into the lower part of the reactor at a velocity of 1 L/min·g for about 14 hours, wherein nitrogen was introduced while being heated from room temperature to 120° C. at a velocity of about 2° C./min., and being heated from 120° C. to 160° C. ata velocity of about 4° C./min.

The weight average molecular weight of the final polylactic acid in which residual monomers were removed through the above process was 152,611 g/mol, and monomers corresponding to about 0.2 wt % of the total weight of polylactic acid remained in the final polylactic acid.

Thus, it is confirmed that if sterically hindered phenol is not added during the polymerization process, and inert gas is introduced at a rapid velocity of flow in the process of removing residual monomers, a molecular weight decrease rate of the final polylactic acid is as high as about 22%.

Comparative Example 2

A Method for Preparing Polylactic Acid

Polylactic acid was prepared by the same method as in Comparative Example 1, except that nitrogen was introduced at a velocity of 0.5 L/min·g in the process of removing residual monomers.

The weight average molecular weight of the finally prepared polylactic acid was 177,524 g/mol, and monomers corresponding to about 0.1 wt % of the total weight of polylactic acid remained in the final polylactic acid.

Thus, it is confirmed that by only controlling the velocity of flow of inert gas in the process of removing residual monomers within the range suggested in the present invention, molecular weight decrease rate may be improved from 22% to 8.7%. However, since sterically hindered phenol was not added in the polymerization process and additional polymerization reaction was not conducted, the effect of improving the molecular weight decrease rate could not be sufficiently exhibited.

The invention claimed is:

1. A method for preparing polylactic acid, comprising:
   a polymerization step wherein lactides or lactic acids are polymerized, and sterically hindered phenol is added when residual monomers are 1 to 8 mol % of the total monomers introduced and additionally reacted to obtain a polymer;
   a cooling step wherein pellets are obtained from the polymer; and
   a step of removing residual monomers wherein inert gas is introduced into a reactor containing the pellets at a velocity of 0.001 to 0.5 L/min while being heated,
   wherein the inert gas is introduced while being heated from room temperature to a temperature of 100 to 130° C. at a first velocity of 1 to 10° C./min, and heated from a temperature of 100 to 130° C. to a temperature of 130 to 170° C. at a second velocity of 1 to 20° C./min,
   wherein polylactic acid passing through the step of removing residual monomers exhibits a molecular weight decrease rate of 5% or less, compared to the polymer obtained in the polymerization step.

2. The method for preparing polylactic acid according to claim 1, wherein in the polymerization step, L-lactide, D-lactide, DL-lactide, meso-lactide, L-lactic acid, D-lactic acid, DL-lactic acid, or mixtures thereof are polymerized.

3. The method for preparing polylactic acid according to claim 1, wherein the polymerization step is conducted at a temperature of 170 to 210° C.

4. The method for preparing polylactic acid according to claim 1, wherein in the polymerization step, sterically hindered phenol is added and then additionally reacted for 80 minutes to 180 minutes.

5. The method for preparing polylactic acid according to claim 1, wherein as the sterically hindered phenol, 2',3-bis-[3-(3,5-di-tert-butyl-4-hydroxyphenyl)propionyl]propionohydrazide, pentaerythritol tetrakis(3-(3,5-di-tert-butyl-4-hydroxyphenyl)propionate), octadecyl-3-(3,5-di-tert-butyl-4-hydroxyphenyl)propionate, or a mixture thereof is used.

6. The method for preparing polylactic acid according to claim 1, wherein the first velocity is slower than the second velocity.

7. The method for preparing polylactic acid according to claim 1, wherein the inert gas is introduced while being heated from room temperature to 120° C. at a velocity of 2° C./min, and being heated from 120° C. to 160° C. at a velocity of 4° C./min.

8. The method for preparing polylactic acid according to claim 1, wherein in the step of removing residual monomers, a time for which the inert gas is introduced is 1 hour to 30 hours.

* * * * *